(12) United States Patent
de Boer et al.

(10) Patent No.: US 6,259,837 B1
(45) Date of Patent: Jul. 10, 2001

(54) OPTICAL INTER-RING PROTECTION HAVING MATCHED NODES

(75) Inventors: Evert de Boer; Peter William Phelps, both of Nepean; Louis Rene Pare, St. Bruno; David Charles Steele, Kanata; Stephen Wilson, Nepean, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/339,254

(22) Filed: Jun. 24, 1999

(51) Int. Cl.[7] ....................................................... G02B 6/28
(52) U.S. Cl. ................ 385/24; 385/16; 359/119
(58) Field of Search .................. 385/16, 17–24; 359/119, 110, 128; 370/222

(56) References Cited

U.S. PATENT DOCUMENTS 6,046,833 * 4/2000 Sharma et al. ........................ 359/119

* cited by examiner

*Primary Examiner*—Phan T. H. Palmer (57) ABSTRACT

The matched nodes provide protection for a failure in the connection between two bidirectional line switched rings. They use a secondary path in case of a primary path failure. The secondary path is set aside in either the working or protection bandwidth of the rings, thus wasting resources. The invention uses inter-ring protection mechanisms which do away with a specifically set aside secondary path between the primary and secondary nodes.

8 Claims, 7 Drawing Sheets

OPTICAL INTER-RING PROTECTION HAVING MATCHED NODES

Field of Invention

The invention resides in the field of telecommunications networks of the type which use fiber optic rings. In particular, it is directed to a novel protection mechanism which finds applications in such telecommunications networks having matched nodes.

BACKGROUND OF INVENTION

Fiber optic rings are widely used for the high speed backbone for telecommunications networks. A bidirectional fiber ring is generally made of at least two optical fibers, one fiber for each direction, to realize a bidirectionality for better performance. For higher reliability and survivability, a bidirectional fiber ring is also provided with a working bandwidth and a protection bandwidth in each direction. These bandwidths are provided either by partitioning each fiber or by provisioning separate fibers. A ring, therefore, may have two, four or more fibers and separate fibers or any partitions thereof can be set aside as the working and protection bandwidths. In practice, however, separate fibers are generally used for working and protection bandwidths for each direction. A failure in a node or in a path of a ring triggers ring switch from the working bandwidth to protection bandwidth. These bidirectional rings (four fibers or two fibers) is called the bidirectional line switched ring (BLSR for short). Optical signals are transmitted through a ring in SONET or SDH format or some such similar format.

Figure 1:
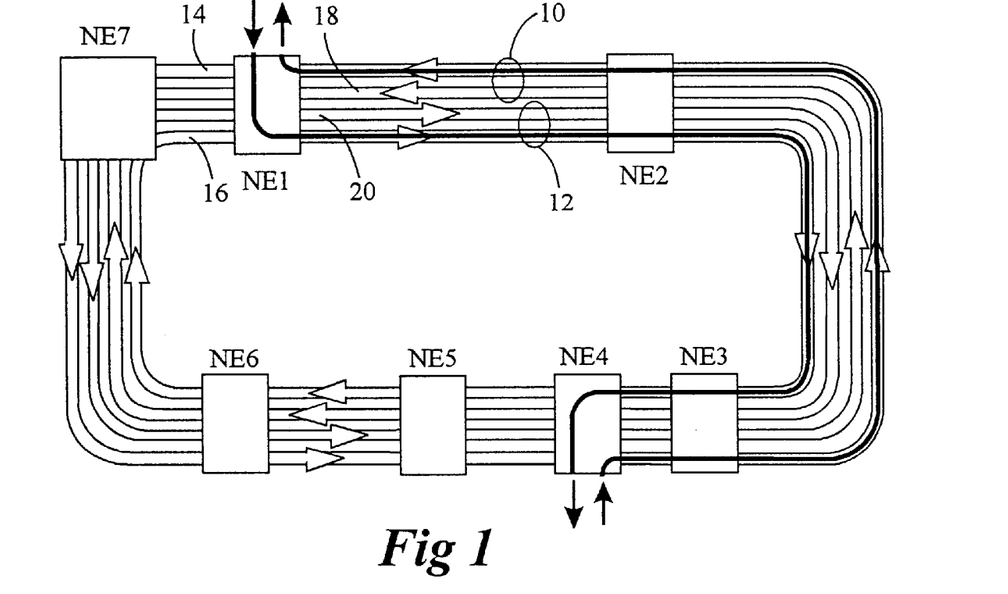
FIG. 1 is a schematic illustration of a two fiber BLSR in normal operations.
Figure 2:
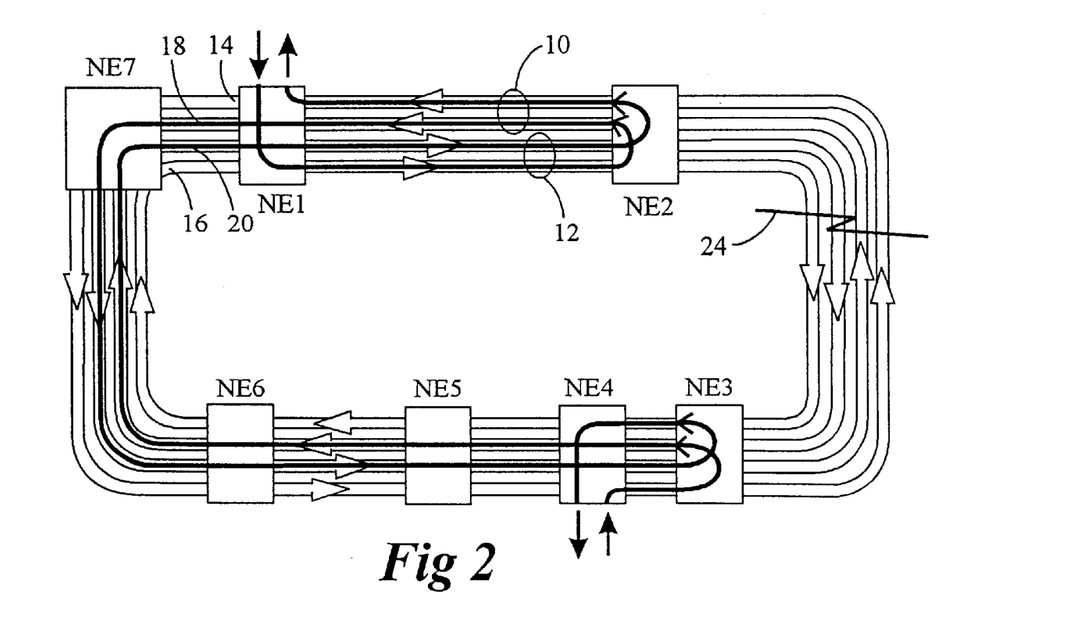
FIG. 2 is a schematic illustration of protection mechanisms of a two fiber BLSR.

FIGS. 1 and 2 illustrate a two fiber BLSR in normal operations and its protection switching mechanisms respectively. In FIG. 1, the connections between the individual network elements (NEs for short or often interchangeably called nodes in the art as well as in this specification) are bidirectional, a fiber 10 for one direction and a fiber 12 for the opposite direction as shown by arrows. Each fiber is partitioned 50—50 in bandwidth providing working bandwidths 14 and 16 and protection bandwidths 18 and 20. This provides a 50% protection capacity. At each NE, a desired traffic is dropped from the line traffic and/or added to it from its tributary. The NEs function as add/drop multiplexers which drops traffic destined to them but pass through the line traffic destined to other NEs. They also add traffic from their tributaries to the line traffic. The line traffic is a high speed traffic around the ring and the tributary traffic usually is a low speed local traffic. In the figure NE1 and NE4 are communicating with one another under normal conditions, using working bandwidths 14 and 16. In FIG. 2, a failure 24 occurred between NE2 and NE3. At NE2, the working bandwidths 14 and 16 are looped back onto protection bandwidths 20 and 18 respectively. At NE3, similar switches occur. At NE1 and NE4, the tributary traffic is still added to and dropped off the working bandwidths. All the remaining NEs are switched to "through" mode. The switch-over between the working bandwidth and the protection bandwidth is called "ring switch" and is invoked by setting certain field in the overhead of the traffic.

Figure 3:
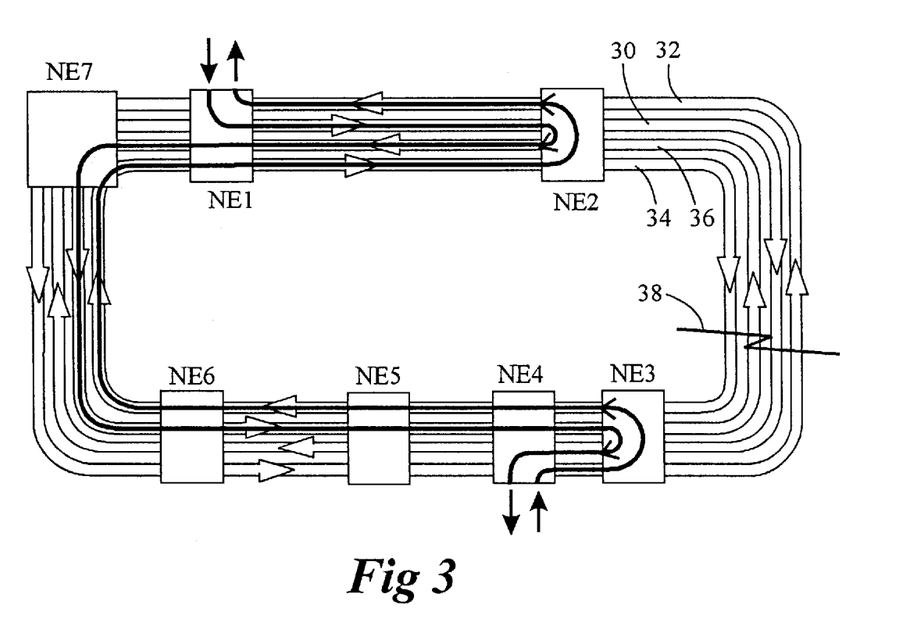
FIG. 3 is a schematic illustration of a four fiber BLSR in normal operations and its protection mechanisms.

FIGS. 3 illustrates a four fiber BLSR in the normal operations and the protection switching mechanisms. The working bandwidths 30 and 32 and protection bandwidths 34 and 36 are provided by separate fibers. This provides a 1:1 (100%) protection. If, for example, an interruption 38 occurs between NE2 and NE3, working bandwidths 30 and 32 are looped back at NE2 and NE3 to protection bandwidths 34 and 36 respectively. All the remaining NEs loop through protection bandwidths.

There are different types of traffic demand patterns in the network and therefore there are different types of architectures to fit the variety of demand patterns. The different architectures need to interface each other but they come with different levels of protection, thus making interfacing them a complicated task. One known way of interconnecting two BLSRs is a technology known as the matched nodes.

Figure 4:
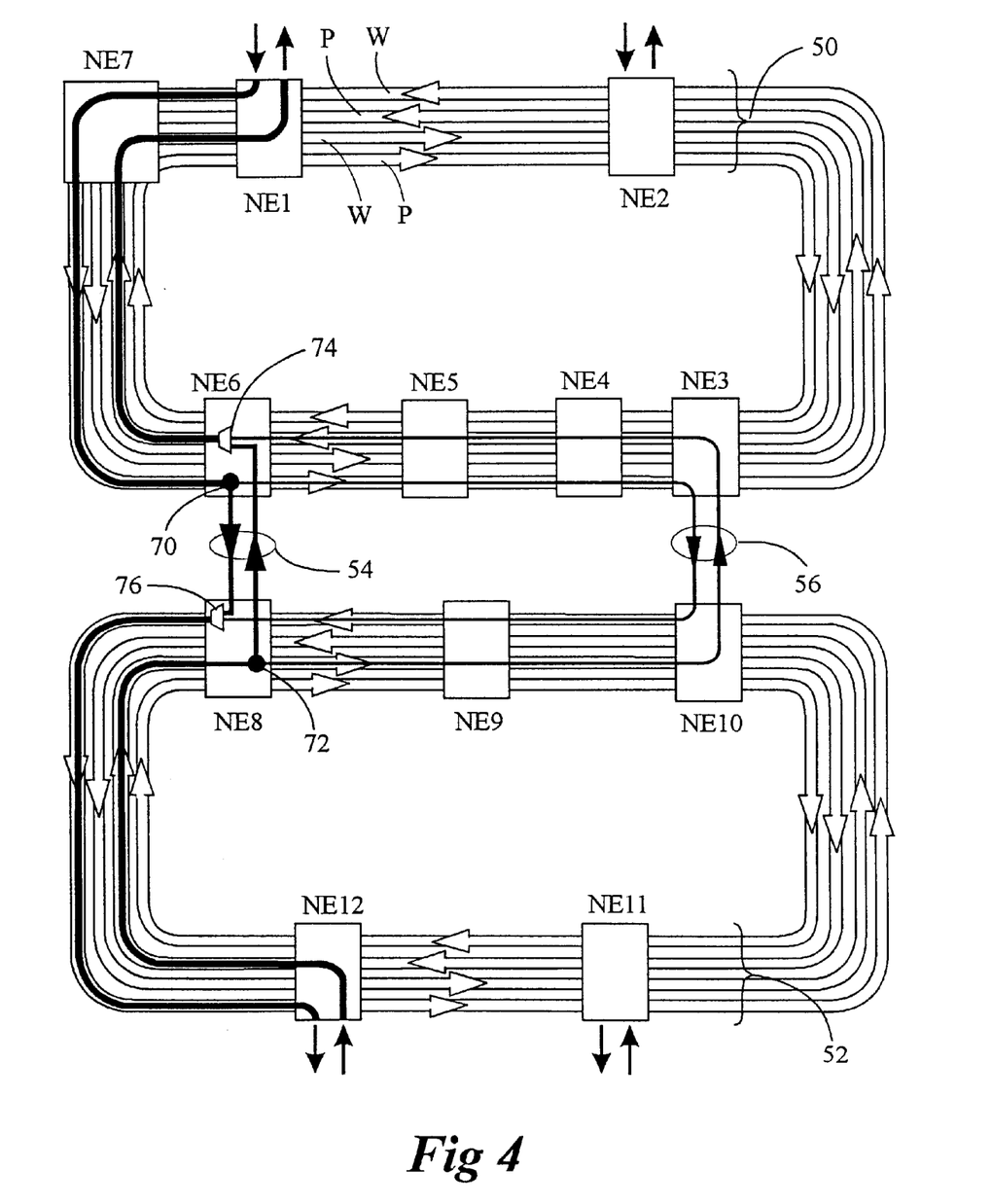
FIG. 4 is a schematic illustration of operations of matched nodes connecting two BLSRs.

The "matched nodes" is a technology known in the industry for interconnecting two rings with protection mechanisms. FIG. 4 shows schematically an example of an integrated inter ring protection using the matched nodes between two BLSRs. In this example, one ring 50 is OC192 BLSR and another ring 52 is a OC48 BLSR. Network elements NE1–NE7 reside in ring 50 and network elements NE8–NE12 reside in ring 52. Four separate fibers (working and protection in each direction, designated by w and p respectively) are shown in each ring but similar arrangement can be made in two fiber BLSR environment. The network elements in this illustration are nodes where tributary traffic is added to and/or dropped from line traffic. During provisioning, the primary nodes and secondary nodes are identified on both rings for various paths between any pair of network elements spanning two rings. Therefore, different paths between different NEs would have different pairs of primary and secondary nodes. In FIG. 4, for example, for a traffic over a path between NE1 and NE12, the primary node are NE6 and NE8 and the secondary nodes are NE3 and NE10. The primary node pair and the secondary node pair are connected bidirectionally by fibers which are usually of a lower speed. In this specification, the primary inter-ring connection therefore consists of a bidirectional primary inter-ring circuit and a pair of the primary nodes as do the secondary inter-ring connection of a bidirectional secondary inter-ring circuit and a pair of the secondary nodes. The inter-ring circuits are therefore in fact tributary at the primary nodes or secondary nodes. The path on the primary inter-ring circuit between primary nodes NE6 and NE8 is called the primary path 54. The path in each direction between NE6 and NE8 by way of NE5, NE4, NE3, NE10 and NE9 is called the secondary path 56.

The secondary path 56 is invoked when the primary inter-ring connection fails, that is to say, when either or both of the primary node (NE6 or NE8) and/or the inter-ring circuit between the primary nodes fail. The primary and secondary paths are separately shown in the figure. The secondary path between the primary node and the secondary node on the same ring can be provisioned over either the working bandwidth or the protection bandwidth. Thus, primary nodes NE6 and NE8 have modules 70 and 72 respectively which perform transmission of traffic in either DCW (drop and continue on working) mode or DCP (drop and continue on protection) mode. In DCW mode, line traffic is dropped to the inter-ring connection and the same traffic is continued on downstream nodes toward the secondary node on the working bandwidth. In DCP mode, the traffic is continued on the protection bandwidth.

Primary nodes have service selectors that allow them to choose either the traffic forwarded from its secondary node via the high-speed connection (line traffic in the ring or secondary path) or directly received from the other ring via the low speed connections (primary inter-ring circuit or primary path). In the Figure, primary nodes NE6 and NE8 have service selectors 74 and 76 respectively for bidirectional operation.

The bandwidth for the secondary path is allocated for the sole purpose of protection in the case of the primary inter-ring connection (i.e., a failure in the primary path or in the primary node) and therefore reduces the overall capacity and capabilities of the ring. The invention addresses these problems which are associated with matched nodes. The invention allows use of bandwidth that normally would have been unavailable due to the secondary path.

SUMMARY OF INVENTION

Briefly stated, in accordance with one aspect, the invention is directed to a primary node for connecting two fiber optic bidirectional line switched rings by way of inter-ring connection. The primary node being comprised of a signaling module for sending into the ring in which it is located a protocol signal indicative of a failure in a primary inter-ring connection, and a protocol module for setting said protocol signal to trigger a ring switch in said ring and to invoke a secondary inter-ring connection through a secondary node. The rings are comprised of a plurality of bandwidths whereby traffic through the inter-ring connection uses one of the plurality of bandwidths, the primary node comprising further a protocol module for setting said protocol signal to trigger a selective ring switch on only the bandwidth used by the traffic through the primary inter-ring connection.

In another aspect, the invention is directed to a telecommunications network of the type which includes a fiber optic bidirectional line switched ring and a primary and a secondary nodes through which another fiber optic bidirectional line switched ring is connected by way of primary inter-ring connection and a secondary inter-ring connection respectively. The primary node has a detection module for detecting a failure in the primary inter-ring connection, a protocol module for generating a protocol signal in the ring in which the primary node is located. The protocol signal is indicative of a failure in the primary inter-ring connection and is for triggering a ring switch in the ring. The secondary node includes a ring switch mechanism for performing the ring switch in response to the protocol signal. The network is further characterized in that the ring has a plurality of bandwidths and traffic through the inter-ring connection uses one of the plurality of bandwidths and the protocol module comprises a mechanism for setting said protocol signal to trigger a selective ring switch on only the bandwidth used by the traffic through the primary inter-ring connection.

In another aspect, the invention resides in a telecommunications network of the type including a fiber optic bidirectional line switched ring and a primary and a secondary nodes through which another fiber optic bidirectional line switched ring is connected by way of primary inter-ring connection and a secondary inter-ring connection respectively.

The primary node has a detection module for detecting a failure in the primary inter-ring connection, a protocol module for generating a protocol signal in the ring in which the primary node is located. The protocl signal is indicative of a failure in the inter-ring connection and is for triggering a ring switch in the ring. The secondary node includes a ring switch mechanism for performing the ring switch in response to the protocol signal. The network further comprises a method of providing protection for failure comprising the step of conducting a selective ring switch only for a bandwidth which has been affected by the failure.

DETAILED DESCRIPTION OF PREFERRED EMBODIMENTS OF INVENTION

As described above, matched nodes use the working (in DCW mode) or protection (in the DCP mode) bandwidth of rings for the secondary path. The secondary path is only used under certain failure scenarios of the primary inter-ring connection. The bandwidth that is allocated for secondary paths cannot be used for anything else. Also, either protection or working bandwidth which has been set aside for the secondary path is set to a "pass through" mode at any nodes which may be located between the primary and secondary nodes. At any of these middle nodes, no add/drop of traffic is permitted on that bandwidth set aside for the secondary path, thus limiting their capability as well as that of any other nodes on the rings which may want to communicate with these middle nodes. This bandwidth therefore does not generate any revenue and reduces over all capacity and capabilities of the ring. The use of secondary path bandwidth is of great concern for network operators who employ particularly large OC192 networks. The invention does not require the secondary path to be set aside in the matched nodes environment. This invention makes it possible to use the bandwidth which would have been unavailable to generate additional revenue.

In the generic conceptual form, the present invention makes no use of the secondary path but uses the ring protection bandwidth to reroute traffic in case of a primary path or primary node failure (i.e., a failure in the primary inter-ring connection). Nodes in the rings are regular network elements such as add/drop multiplexers. The primary and secondary nodes and inter-ring connections are provisioned initially but neither service selectors nor drop-and-continue functionality is needed at the primary nodes. The invention uses the already available ring protection bandwidth for "secondary connection". The invention hence frees up this bandwidth for other use which would normally have to be set aside for the secondary path. There are many possible embodiments which implement the concept.

Figure 5:
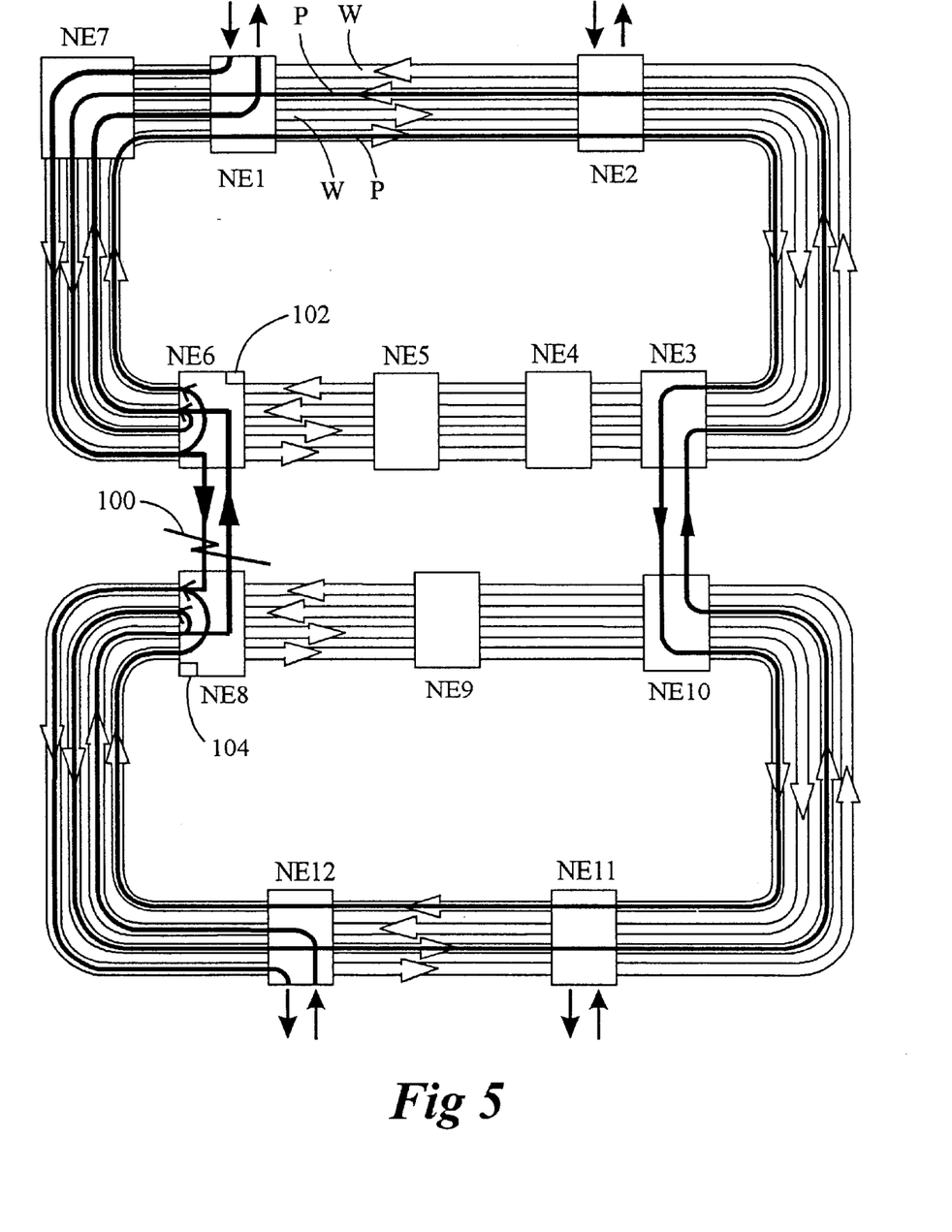
FIG. 5 shows schematically one embodiment of the present invention.

FIG. 5 illustrates one such embodiment of the invention. This embodiment includes a protection mechanism of the invention and would solve the problem of a primary inter-ring circuit failure. Referring to FIG. 5, in the case of such a failure 100 as shown in the figure, both primary nodes NE6 and NE8 will detect this condition by detecting a Loss of Signal (LOS or LAIS signals) on their tributaries. In this embodiment, the both primary nodes are equipped with a protection module 102 and 104 which performs selective protection procedure in their own ring. According to this procedure, upon detecting a LOS or LAIS on its tributaries, a primary node performs a selective ring switch and reroute the affected traffic to the protection bandwidth. The protection module 102 or 104 includes a detection module for detecting a failure, a signaling module for sending messages in the form of protocol signals to other nodes in its own ring and a protocol module for setting the protocol signals to inform of the failure and trigger a selective ring switch at the secondary node. While a ring switch according to the known BLSR protection mechanisms will reroute at a node the whole traffic on the working bandwidth to the protection bandwidth, the selective ring switch reroute only affected bandwidth, leaving other bandwidth nonimpacted. Therefore the local traffic is continued to be added/dropped on the unaffected bandwidths at the node where a selective ring switch is taking place. Having been informed of the failure, the secondary node NE3 performs a selective ring switch and will pick up the affected traffic and drop it to its tributary (inter-ring connection between the two rings) from the protection bandwidths. If the other BLSR ring is equipped with the present invention, similar selective ring switches are performed at NE8 and NE10, initiated by the protection module 104 at NE8.

Figure 6:
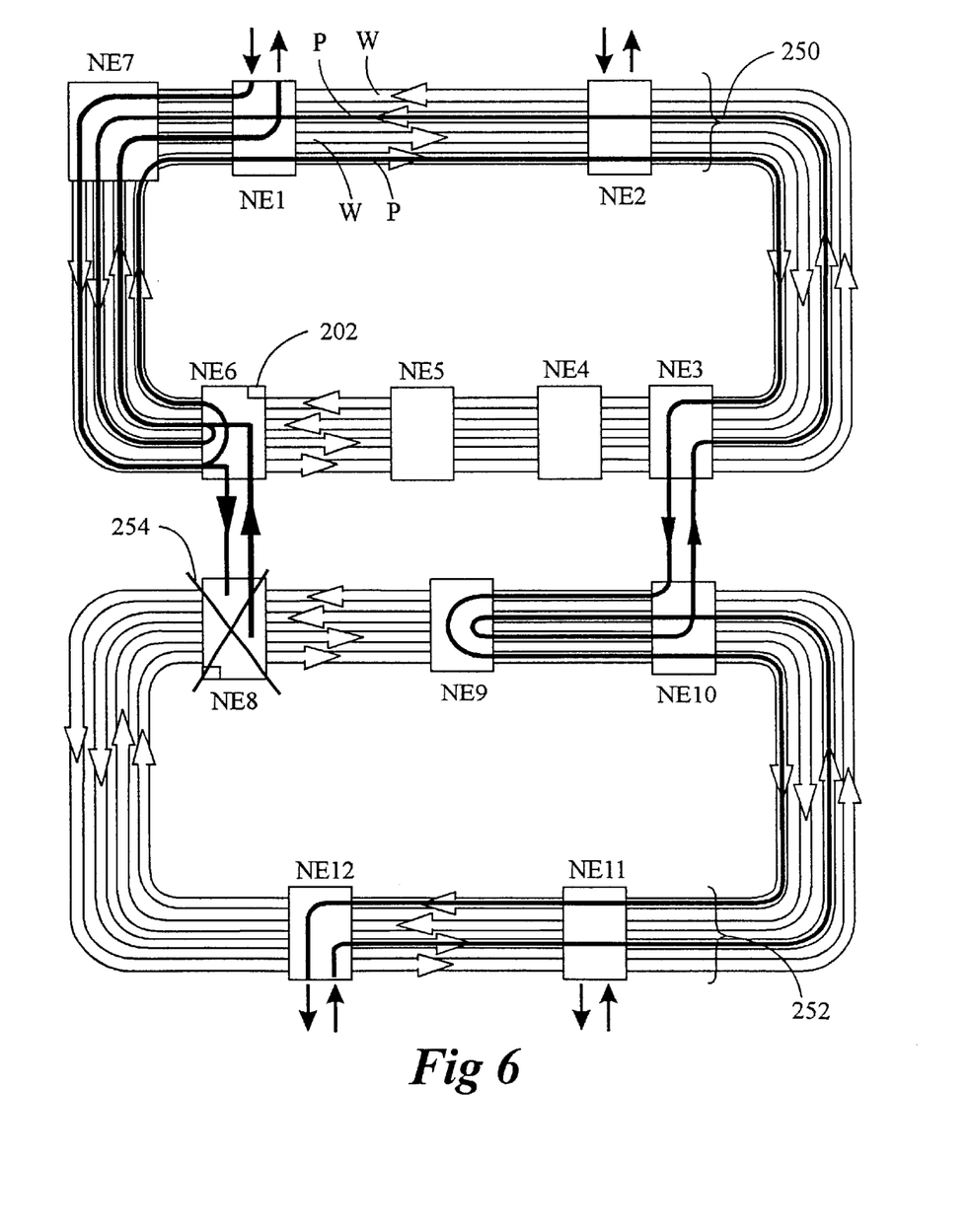
FIG. 6 shows schematically another embodiment of the present invention.

Referring to FIG. 6, when NE8 fails, other primary node NE6 will detect a LOS or LAIS. The protection module 202 executes similar procedure described above in ring 250 which includes a selective ring switch at NE3 and NE6 for the traffic that was dropped over the primary path (inter-ring circuit at NE6). As for ring 252, a node failure 254 at NE8 would trigger the execution of regular protection mechanisms, which include a ring switch at neighboring nodes, e.g. NE9 and NE12, as shown in the figure.

Figure 7:
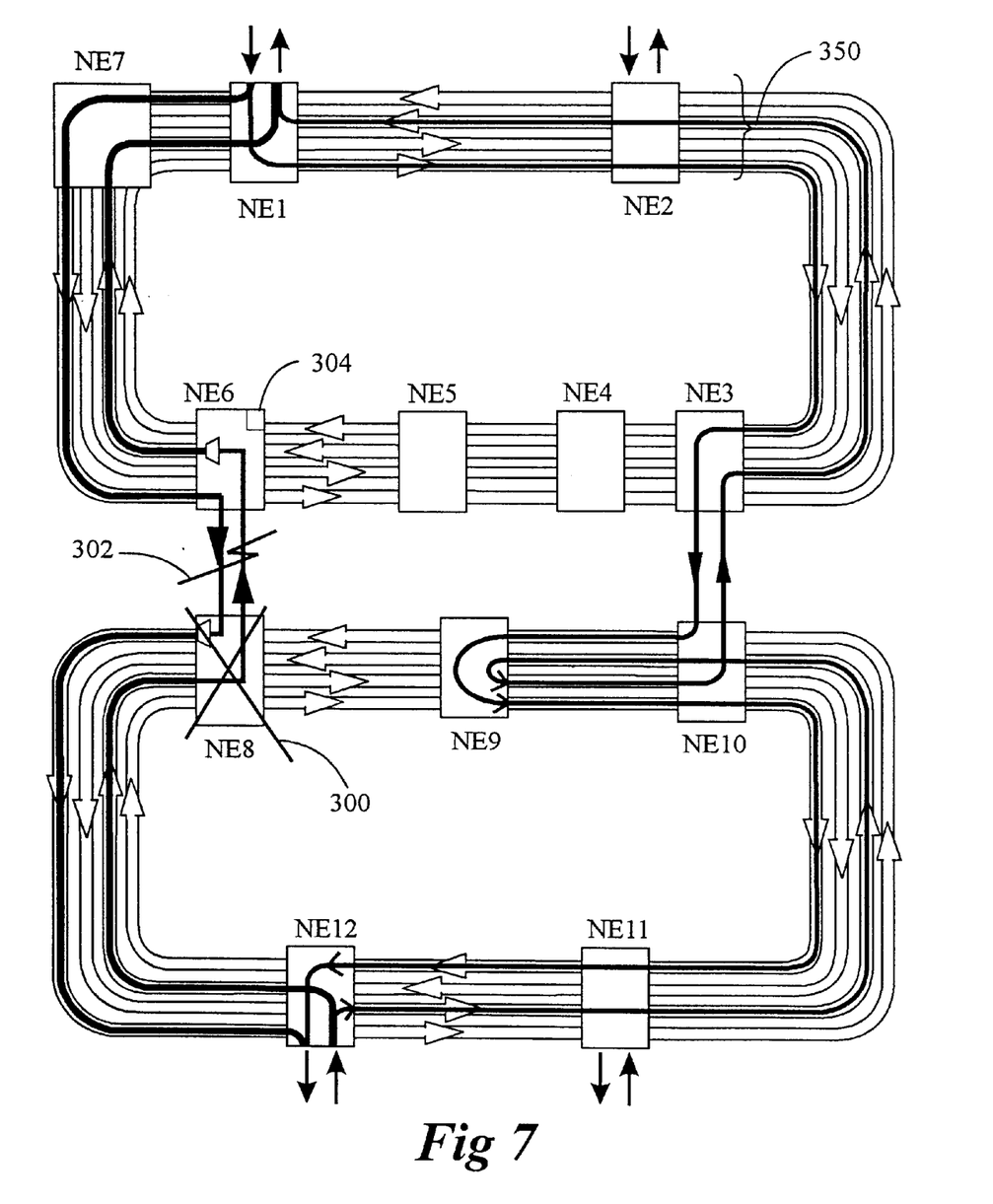
FIG. 7 shows schematically a further embodiment of the present invention.

FIG. 7 shows schematically the invention according to a further embodiment. The figures illustrates a fault 300 at NE8 or a break 302 in the inter-ring circuit (primary path). When either failure occurs, NE6 detects a loss-of-signal at its tributary. As described earlier, the protection module 304 would initiate a selective ring switch in ring 350. NE3 is the secondary node for this path and perform a selective ring switch in response to the indication from the primary node of a failure condition. As described earlier in connection with FIGS. 5 and 6, a selective ring switch performed on the primary node may result in a long path to the secondary node, e.g. a path from NE6, NE7, NE1, NE2 and NE3. Depending the topology, this rerouting path may be substantial. According to this embodiment, the protocol can direct to any node in the same ring to perform the selective ring switch. For example, a selective ring switch can be performed at NE7 or more commonly at NE1 (source node or service access point) as shown in FIG. 7. Due to the topology of the ring and other network parameters, it may be important to execute the ring switch at a certain node because it will result in shorter rerouting protection path, or other desirable performance.

It should be emphasized that the ring switches can perform switch-over of a whole fiber as well as of only a specifically affected bandwidth. A selective ring switch of affected bandwidths is described in the embodiments thus far in which if a failure affects only one bandwidth of a connection between two communicating nodes, all other connections which are not affected by the failure will not be switched. Nodes in these embodiment includes protocol modules which allow selective ring switch of one or more certain bandwidths. It should of course noted that under certain circumstances, a regular ring switch of the whole bandwidths can be equally used to implement the inventive concept. It should further be noted that although breaks and failures are shown thus far to affect in two directions, it is possible for only one direction to fail. In regular practice, however, as both directions are often collocated, a failure in one direction would trigger protection mechanisms for both directions.

Figure 8:
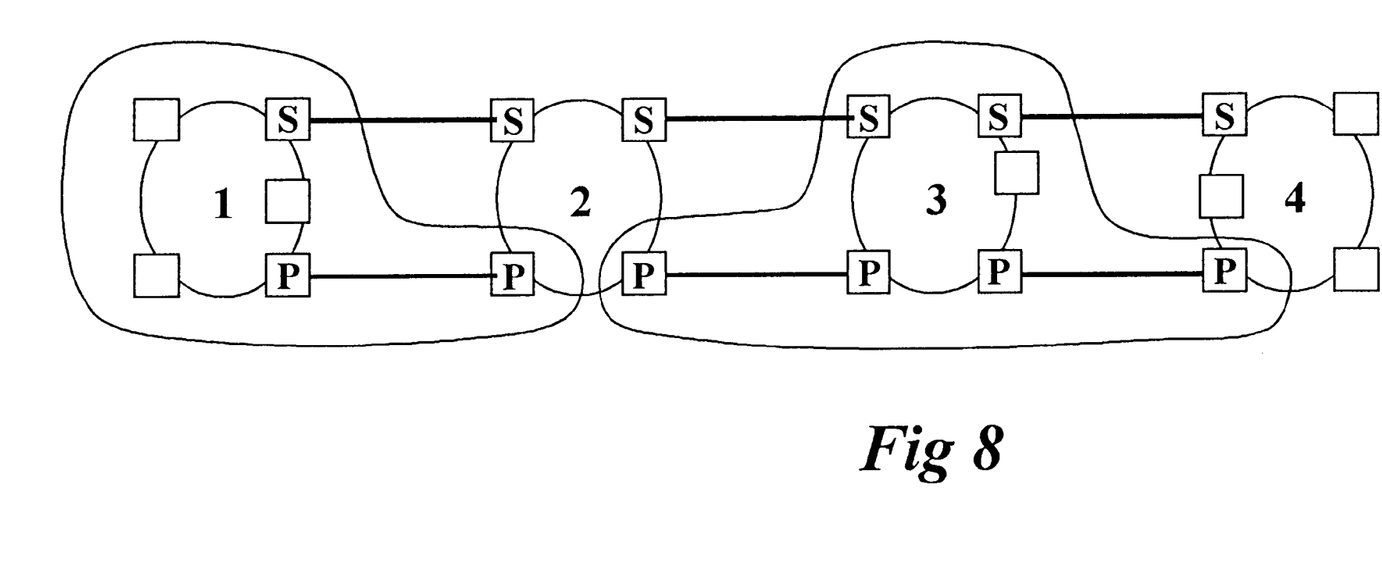
FIG. 8 is a schematic illustration of a network made up of a plurality of rings connected by matched nodes.

In FIG. 8, three or more rings are connected by matched nodes. In the Figure, P and S signify primary and secondary nodes. It illustrates that two or more rings can be considered as one larger ring and a failure in one ring could cause a selective ring switch in the larger ring. For example, a failure of a primary node in ring 2 will cause a selective ring switch in ring 1 and a ring switch in ring 2. In other words, the primary node in ring 2 becomes a "node" of ring 1. Similarly, ring 3 in the Figure extends to the primary nodes in ring 2 and 4.

What we claim as our invention is:

1. A primary node for connecting two fiber optic bidirectional line switched rings by way of inter-ring connections, the primary node being comprised of a signaling module for sending into the ring in which it is located a protocol signal indicative of a failure in a primary inter-ring connection and a protocol module for setting said protocol signal to trigger a ring switch in said ring and to invoke a secondary inter-ring connection through a secondary node, the rings comprised of a plurality of bandwidths whereby traffic through the inter-ring connection uses one of the plurality of bandwidths, the primary node comprising further a protocol module for setting said protocol signal to trigger a selective ring switch on only the bandwidth used by the traffic through the primary inter-ring connection.

2. In a telecommunications network of the type including a fiber optic bidirectional line switched ring and a primary and a secondary nodes through which another fiber optic bidirectional line switched ring is connected by way of primary inter-ring connection and a secondary inter-ring connection respectively, the primary node having a detection module for detecting a failure in the primary inter-ring connection, a protocol module for generating a protocol signal in the ring in which the primary node is located, the protocol signal being indicative of a failure in the primary inter-ring connection and for triggering a ring switch in the ring in which the primary node is located and the secondary node having a ring switch mechanism for performing the ring switch in response to the protocol signal, a method of providing protection for failure, in which the step of conducting a ring switch comprises further steps of:

identifying a source node of a traffic, and conducting the selective ring switch at the source node.

3. A telecommunications network of the type including a fiber optic bidirectional line switched ring and a primary and a secondary nodes through which another fiber optic bidirectional line switched ring is connected by way of primary inter-ring connection and a secondary inter-ring connection respectively, the primary node having a detection module for detecting a failure in the primary inter-ring connection, a protocol module for generating a protocol signal in the ring in which the primary node is located, the protocol signal being indicative of a failure in the primary inter-ring connection and for triggering a ring switch in the ring in which the primary node is located and the secondary node having a ring switch mechanism for performing the ring switch in response to the protocol signal, the ring in which the primary node is located has a plurality of bandwidths and traffic through the inter-ring connection uses one of the plurality of bandwidths and the protocol module comprises a mechanism for setting said protocol signal to trigger a selective ring switch on only the bandwidth used by the traffic through the primary inter-ring connection.

4. The telecommunications network of the type including a fiber optic bidirectional line switched ring and a primary and a secondary nodes, according to claim 3 wherein the secondary node comprising further:

a module for invoking the secondary inter-ring connections in response to the protocol signal.

5. The telecommunications network of the type including a fiber optic bidirectional line switched ring and a primary and a secondary nodes, according to claim 4 wherein a plurality of nodes in the ring each has a selective ring switch mechanism for performing the selective ring switch in response to the protocol signal.

6. The telecommunications network of the type including a fiber optic bidirectional line switched ring and a primary and a secondary nodes, according to claim 5 wherein a node in the ring from which a traffic originates has a selective ring switch mechanism for performing the selective ring switch in response to the protocol signal.

7. The telecommunications network of the type including a fiber optic bidirectional line switched ring and a primary and a secondary nodes, according to claim 4 wherein the primary and secondary nodes are matched nodes.

8. In a telecommunications network of the type including a fiber optic bidirectional line switched ring and a primary and a secondary nodes through which another fiber optic bidirectional line switched ring is connected by way of primary inter-ring connection and a secondary inter-ring connection respectively, the primary node having a detection module for detecting a failure in the primary inter-ring connection, a protocol module for generating a protocol signal in the ring in which the primary node is located, the protocol signal being indicative of a failure in the primary inter-ring connection and for triggering a ring switch in the ring in which the primary node is located and the secondary node having a ring switch mechanism for performing the ring switch in response to the protocol signal a method of providing protection for failure comprising the step conducting a selective ring switch only for a bandwidth which has been affected by the failure.

* * * * *